(No Model.)
E. G. MOULTON.
HUB FOR VEHICLE WHEELS.
No. 390,613. Patented Oct. 2, 1888.
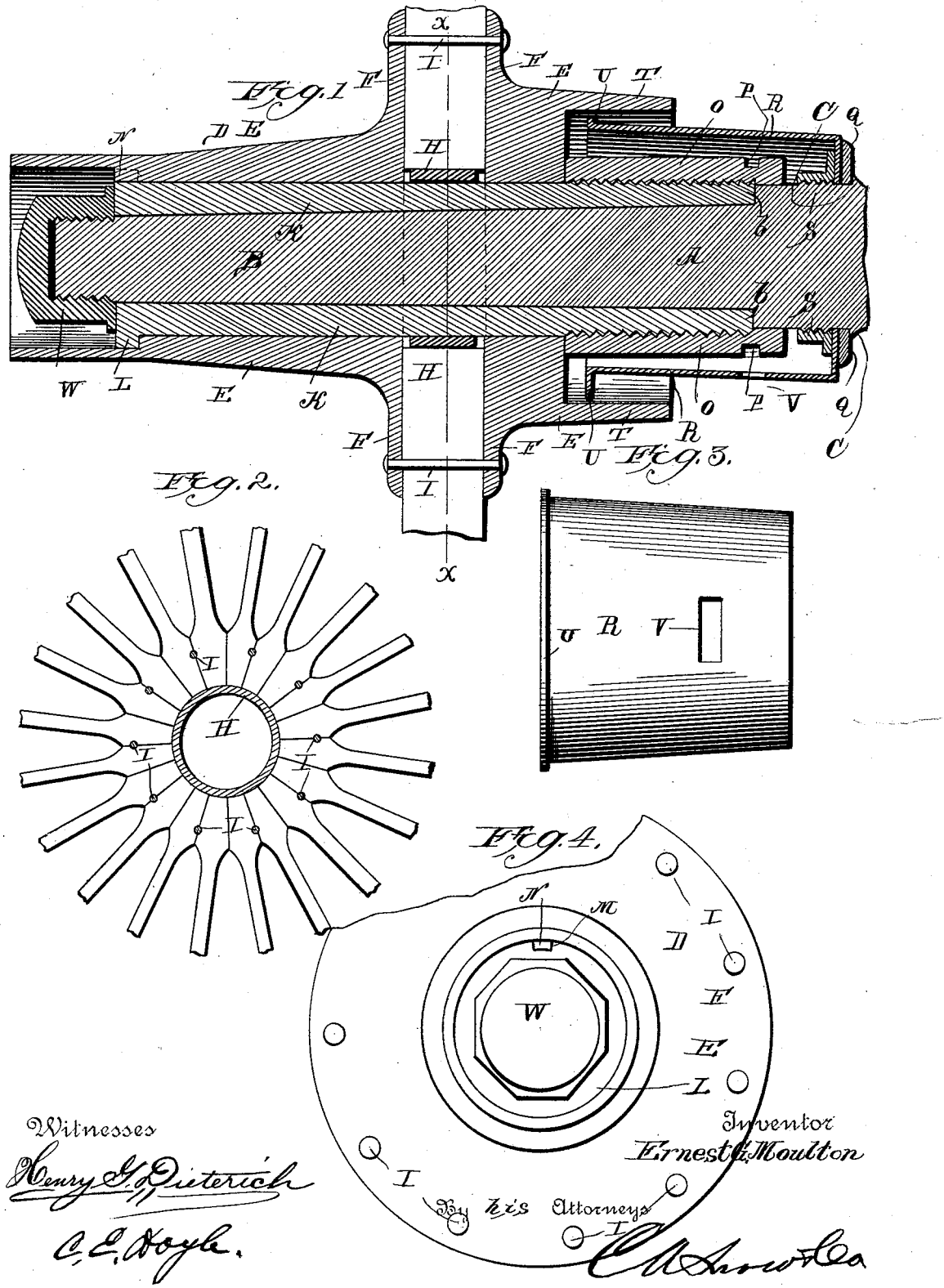
Witnesses
Henry G. Dieterich
C. L. Hoyle
Inventor
Ernest G. Moulton
By his Attorneys

UNITED STATES PATENT OFFICE.

ERNEST G. MOULTON, OF HOLLAND, VERMONT.

HUB FOR VEHICLE-WHEELS.

SPECIFICATION forming part of Letters Patent No. 390,613, dated October 2, 1888.

Application filed May 19, 1888. Serial No. 274,379. (No model.) Patented in Canada April 14, 1888.

*To all whom it may concern:*

Be it known that I, ERNEST G. MOULTON, a citizen of the United States, residing at Holland, in the county of Orleans and State of Vermont, have invented new and useful Improvements in Wheels, (and for which a patent has been granted to me in Canada on April 14, 1888,) of which the following is a specification.

My invention relates to improvements in wheels; and it consists in a certain novel construction and combination of devices, fully set forth hereinafter in connection with the accompanying drawings, wherein—

Figure 1 is a longitudinal central section of a wheel embodying my improvements. Fig. 2 is a transverse section on the line $xx$ of Fig. 1. Fig. 3 is a bottom plan view of the dust or sand box. Fig. 4 is an end view of the hub.

Referring to the drawings, A designates a portion of the axle, having the spindle B provided at its inner end with the shoulder C. The hub D is composed of the separable sections E E, having vertical opposing flanges F F on their adjacent ends between which the tapered lower or inner ends of the spokes are arranged. The extremities of the spokes bear on the metallic ring H, which is slightly narrower than the spokes, and is located between the opposing ends of the sections E. The sections are held tightly clamped together against the inner ends of the spokes by the rivets or bolts I, which engage the flanges F, and when the spokes become loose the sections of the hub are drawn closer together to clamp the spokes, (the metallic ring H being made of a less width than the spokes for this reason.)

The box K passes through the hub, and is mounted on the spindle, and the outer end of the box is provided with a peripheral outstanding flange, L, bearing against the outer end of the outer section of the hub and having a notch, M, to receive a stud or projection, N, on the end of the hub to prevent the box from turning therein. A polygonal nut, O, is screwed on the inner end of the box and bears against the inner end of the hub, and it is provided near its inner end with a peripheral groove, P, for a purpose to be explained.

A movable collar, Q, is arranged on the spindle against the shoulder C, and the inner end of the sand-box R, which is mounted on the spindle, bears against the collar, and is held tightly against the same by the flanged nut S, which is screwed on the threaded portion of the spindle within the sand box. The sand-box is rigid with the axle-spindle and extends outwardly within the inwardly-extending collar T on the inner edge of the hub, and the outer extremity of the sand-box is provided with the outstanding peripheral flanges U, adapted to substantially fill the bore of the collar T.

The sand-box is irregular in shape, having its upper and lower sides inclined downwardly toward the inner end, or away from the peripheral flange U, and the lower side of the said box is provided with the transverse slot or opening V, directly under the groove in the polygonal nut. The advantage of this construction of the sand-box is that any dust or sand which may fall thereon will work inward or away from the hub if it does not fall off immediately; or if any dust should pass into the box over the flange U it will work inward away from the bearing of the wheel and will pass out through the discharge slot or opening V. Any dust which, after entering the sand-box, clings to the polygonal nut will be received by (or at least cannot pass farther inward than) the peripheral groove therein, and will from thence drop through the above-mentioned discharge slot or opening. The cap or nut W is screwed on the outer threaded end of the spindle. The box may be removed from the hub without disturbing the arrangement of the sections thereof or the spokes, and as the box is passed through the hub from its outer end the nut which secures it in place is out of the way, (thereby making the appearance of the hub neater,) and the outer or exposed end of the hub is not as liable to be marred or scratched in removing and replacing the nut.

The herein-described construction of hub enables the inner ends of the spokes to be tightened readily, and also enables the hub to be more easily, cheaply, and strongly made.

The inner end of the box K bears against an offset, $b$, on the spindle, and the polygonal nut, which clamps the hub against the flange on the outer end of the box K, overhangs the said offset and forms a guard to protect the spindle from dust which may pass over the peripheral groove in the said polygonal nut.

Having thus described my invention, I claim—

1. The combination, with the spindle having a sand-box attached to its inner end, of the axle-box passing through the hub, and having a peripheral flange bearing against the outer end of the latter, and provided with a notch engaging a stud or projection on the end of the hub, and the nut screwed on the inner end of the box and bearing against the inner end of the hub, substantially as specified.

2. The combination, with the spindle having an offset, $b$, near its inner end, of the axle-box passed through the hub from its outer end, and having a peripheral flange bearing against the outer end of the same, the inner end of the said box bearing against the offset $b$, the cap or nut screwed on the outer end of the spindle, and the nut mounted on the inner threaded end of the box and bearing against the inner end of the hub, the inner end of the said nut overhanging the offset $b$, substantially as specified.

3. The combination, with the spindle, of the axle-box mounted thereon and arranged within the hub, with a nut, O, on its inner end, provided with a peripheral groove, and the sand-box attached to the spindle and passing at its outer end within an overhanging collar on the inner end of the hub, and having a discharge slot or opening in its lower side, substantially as and for the purpose specified.

4. The combination, with the spindle and the box mounted thereon, of the sand-box attached to the spindle and embracing the inner end of the box, the upper and lower sides of the box being inclined downward toward the inner end, substantially as specified.

5. The combination, with the spindle and the box mounted thereon and having the hub embracing the same, and provided with an inwardly-extending collar, of the sand-box extending at its outer end within the said collar, and having its upper and lower sides inclined downward toward the inner end, and provided in its lower side with a discharge opening or slot, and the peripheral flange on the outer end of the sand-box fitting in the said collar, substantially as specified.

In testimony that I claim the foregoing as my own I have hereto affixed my signature in presence of two witnesses.

ERNEST G. MOULTON.

Witnesses:
FRED TAYLOR CASWELL,
ALVAH K. DARLING.